J. M. CAMPBELL.
FENCE POST.
APPLICATION FILED JUNE 29, 1908.
957,410.
Patented May 10, 1910.
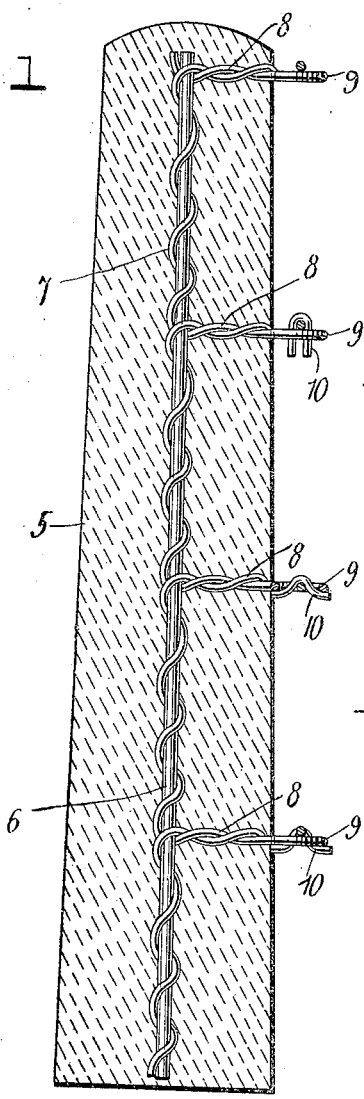
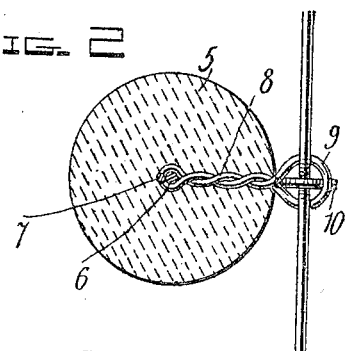
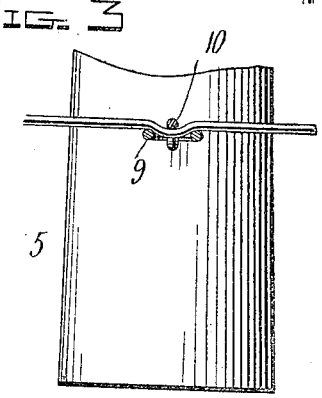
Witnesses
Inventor
Joseph M. Campbell
By Chandler & Chandler
Attorneys

UNITED STATES PATENT OFFICE.

JOSEPH M. CAMPBELL, OF MEMPHIS, TENNESSEE.

FENCE-POST.

957,410.  Specification of Letters Patent.  Patented May 10, 1910.

Application filed June 29, 1908. Serial No. 440,940.

*To all whom it may concern:*

Be it known that I, JOSEPH M. CAMPBELL, a citizen of the United States, residing at Memphis, in the county of Shelby, State of Tennessee, have invented certain new and useful Improvements in Fence-Posts; and I do hereby declare the following to be a full, clear, and exact description of the invention, such as will enable others skilled in the art to which it appertains to make and use the same.

This invention relates to fence posts and more particularly to that class which are of plastic material and which have embedded in them fence-wire securing devices.

One of the novel features of the invention resides in the peculiar construction of the fence-wire attaching devices mentioned above, the device for each post being in the form of a length of heavy wire or rod around which is twisted a small wire which at intervals is bent to form loops which, after the device has been embedded in the post, projects beyond the post, the line wires of the fence being stretched one above each of the loops and staple-like U clips being placed over the wires and through the respective loops the prongs of the clip being bent back to engage beneath the loop at diametrically opposite points and thereby hold the line wire in place.

In the accompanying drawings, Figure 1 is a front elevation of the fence post constructed in accordance with my invention, Fig. 2 is a detail perspective view of a portion of the post showing the wire securing clip as first inserted, Fig. 3 is a similar view but showing the arms of the clip bent back to securing position.

In the drawings, the post, indicated by the numeral 5, is of the ordinary size and construction it being formed from plastic material and having embedded in it, at the time of its manufacture, the fence wire securing devices embodying the invention.

The fence wire attaching device of each post is in the form of a rod or length of heavy wire indicated by the numeral 6 and twisted spirally around the rod or wire 6 is a smaller wire 7 which at intervals, is bent laterally from the rod 6 in the form of a U as clearly shown in dotted lines in Fig. 4 of the drawings and is then twisted so as to form a stem portion 8 and an eye 9 at the end of the stem portion it being understood that when the device is embedded in the post, the several eyes of the device are exposed the stems 8 and the rod 6 being however incased in the material of the post. The stems 8 and the eyes 9 are of course formed at such distances apart as it is desired to stretch the line wires of the fence and in stringing the wires, they are stretched one above each eye 9 and a staple-like U clip is placed over each line wire and with its prongs projecting through the corresponding eye, the said prongs being afterward turned back upon themselves as clearly shown in Fig. 3 of the drawings so as to firmly secure the line wires in place.

From the foregoing description of my invention, it will be seen that I have provided a very inexpensive means for attaching the line wires of a fence to the loops or eyes upon the post embodying the invention and it will be further understood that the use of complicated tools is obviated, a pair of pliers being all that is necessary in order to bend the prongs of the new clip into locked position.

What is claimed is:

In a cementitious fence post, a reinforcing rod extending longitudinally of said post, and a length of wire twisted around said post in a series of spirals, the ends of each spiral overlapping the adjacent ends of the adjacent spirals to form a substantially continuous spiral extending the entire length of said rod, and a wire being twisted at the ends of each spiral to form fence wire attaching loops extending outward from said rod, the twisted portions of said loops lying wholly within the post and the ends of the loops lying exterior of said post.

In testimony whereof, I affix my signature, in presence of two witnesses.

JOE M. CAMPBELL.

Witnesses:
A. J. WILLIFORD,
J. STALEY WILLIFORD.